United States Patent [19]

Fernsler et al.

[11] Patent Number: 5,329,367
[45] Date of Patent: Jul. 12, 1994

[54] HORIZONTAL BLANKING

[75] Inventors: Ronald E. Fernsler; Walter Truskalo, both of Indianapolis, Ind.

[73] Assignee: Thomson Consumer Electronics, Inc., Indianapolis, Ind.

[21] Appl. No.: 980,811

[22] Filed: Nov. 24, 1992

Related U.S. Application Data

[63] Continuation-in-part of Ser. No. 939,859, Sep. 2, 1992, Pat. No. 5,223,931, which is a continuation of Ser. No. 499,249, Mar. 26, 1990, abandoned.

[30] Foreign Application Priority Data

Dec. 13, 1991 [GB] United Kingdom ............ 9126550.4

[51] Int. Cl.$^5$ .................. H04N 3/24; H04N 5/04
[52] U.S. Cl. .................................. 348/540; 348/500
[58] Field of Search ............ 358/148, 150, 158, 165; 331/20, 50; H04N 5/00, 5/04, 5/12, 3/24

[56] References Cited

FOREIGN PATENT DOCUMENTS 57-52268  3/1982  Japan ................... 358/148

Primary Examiner—James J. Groody
Assistant Examiner—Chris Grant
Attorney, Agent, or Firm—Joseph S. Tripoli; Joseph J. Laks; Harvey D. Fried

[57] ABSTRACT

In a horizontal deflection system, an $nf_H$ timing signal is generated synchronously with an $f_H$ horizontal synchronizing component in a video signal, where $nf_H$ is a higher frequency than $f_H$. A first circuit is responsive to the $nf_H$ timing signal for generating an $nf_H$ scan synchronizing signal synchronously with the nfH timing signal. A horizontal deflection stage is operable at $nf_H$ and responsive to the $nf_H$ scan synchronizing signal. A second circuit is responsive to the same $nf_H$ timing signal for generating horizontal blanking pulses. The $nf_H$ timing signal can be generated by a first phase locked loop and a frequency divider. The first circuit responsive to the $nf_H$ timing signal can comprise a second phase locked loop. The second circuit responsive to the nfH timing signal can comprise a driver/inverter. The horizontal blanking pulses are combined with vertical blanking pulses to form a composite blanking signal.

16 Claims, 5 Drawing Sheets

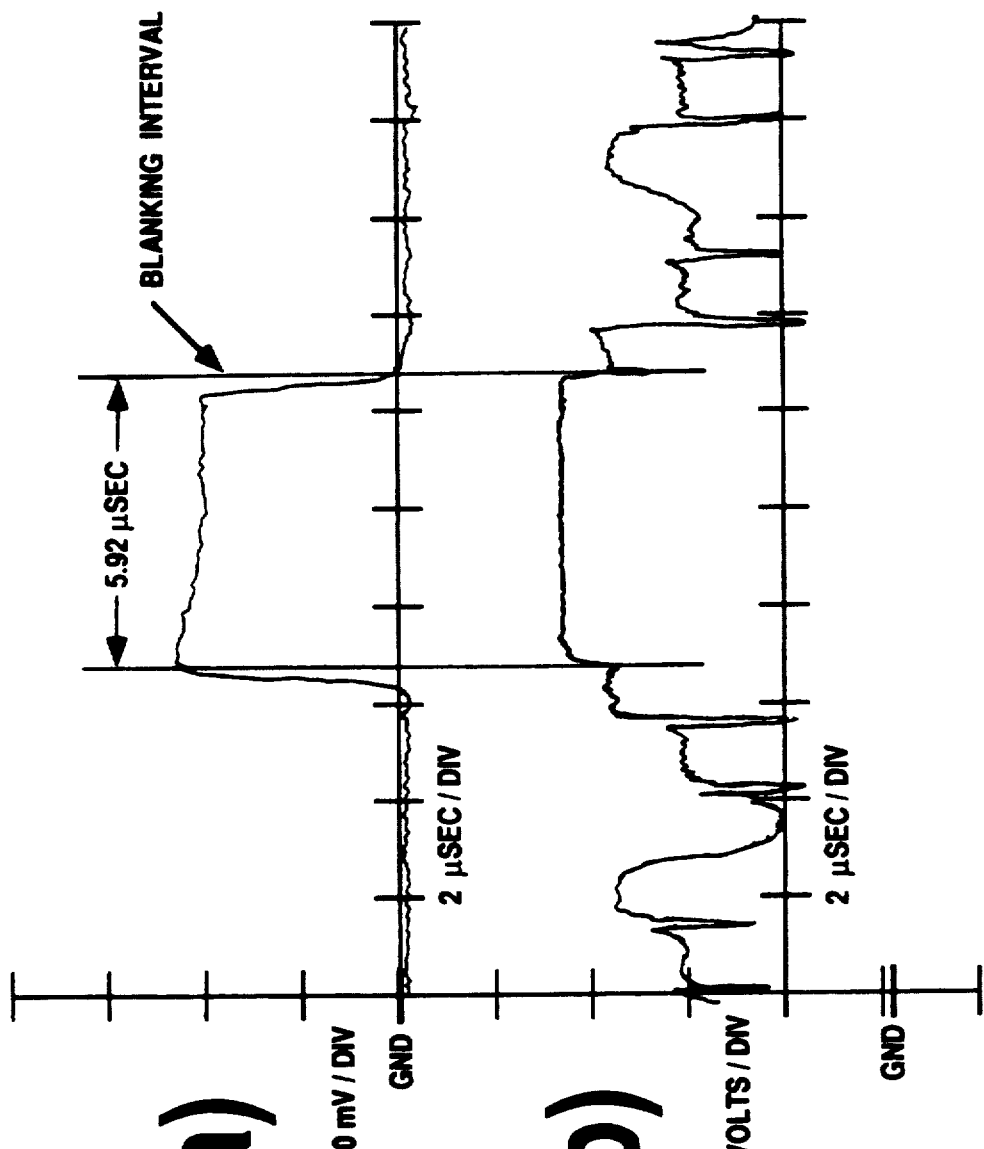

HORIZONTAL BLANKING

CROSS REFERENCE TO RELATED APPLICATIONS

This is a continuation-in-part of U.S. patent application Ser. No. 07/939,859, filed Sep. 2, 1992, now U.S. Pat. No. 5,223,931, which is itself a continuation of U.S. patent application Ser. No. 07/499,249, now abandoned, filed Mar. 26, 1990. The subject matter of these applications is fully incorporated herein by reference. European patent application 91104749.6, published as EP 0 449 198 A2 on Oct. 2, 1991, corresponds to U.S. Pat. No. 5,223,931.

BACKGROUND OF THE INVENTION

This invention relates to the field of synchronization systems for televisions and the like, and in particular, to the generation of horizontal blanking signals for multiple scan rate operation. For example, the horizontal blanking signals are generated at $2f_H$, where $f_H$ is the conventional horizontal scanning frequency.

Proper width and deflection/video timing are important in achieving a video signal that does not have any fold over. This is especially true in high end receivers that run at multiple horizontal frequencies ($nf_H$), and lower overscans. The amount of overscan for multiple frequency scanning is approximately 5% to 7%, as compared to the 10% to 12% overscan which is common for conventional scanning rates. Accordingly, the need is greater for accurate timing of the horizontal blanking signal.

Typically, horizontal blanking is derived from a lower voltage pulse on a secondary winding of the high voltage flyback transformer. A problem with this scheme is that the rise time of the pulse is not fast enough to blank adequately the video in the horizontal yoke current retrace interval which is generated by a higher voltage pulse. Moreover, unless the pulse is heavily differentiated and then stretched to make the pulse wide enough, the timing of the beginning of blanking is later than needed. Unfortunately, heavy differentiation creates other problems in the form of false triggering of the blanking circuit when flyback ringing pulses become high enough to trigger the circuit.

One approach which is known to overcome these problems uses two capacitors arranged in a capacitive voltage divider arrangement. This removes the secondary ringing problem and gives better timing than the secondary winding approach. However, this approach is problematic in that at least one high voltage capacitor is needed in the divider.

Another approach is to generate a blanking pulse from timing signals that precede the retrace interval. This can be done by using a pair of one-shot monostable multivibrators. A first one of the one-shots is triggered by one of the horizontal synchronizing signals and defines an initial delay of nearly one whole horizontal line. A second one-shot is triggered by the output of the first one-shot at the end of this delay, and defines the pulse width. However, there are problems associated one shots, such as false triggering, which results in improperly timed blanking.

SUMMARY OF THE INVENTION

A better solution in accordance with an inventive arrangement is particularly appropriate for a multiple horizontal frequency synchronizing circuit having a first phase locked loop (PLL) operating at $1f_H$ and a second phase locked loop operating at $2f_H$. A synchronizing circuit having such first and second phase locked loops, as well as a circuit for dividing the output of a $32f_H$ oscillator by 16 to obtain the $2f_H$ signal, is described in U.S. Pat. No. 5,043,813, issued Aug. 27, 1991, the subject matter of which is fully incorporated herein by reference. Such a multiple frequency synchronizing circuit is also described in European Patent Application 91104749.6, published as EP 0 449 198 A2 on Oct. 2, 1991, which corresponds to U.S. Pat. No. 5,223,931.

The first phase locked loop includes an $nf_H$ oscillator, for example $32 f_H$, and is synchronized with an incoming video signal. The second phase locked loop is synchronized with the horizontal deflection circuit. A $1f_H$ to $2f_H$ converter circuit, which can be implemented as a $32f_H/16$ frequency dividing counter, is responsive to the $32f_H$ oscillator and synchronized by the $1f_H$ output of the first phase locked loop. The frequency divider provides a $32f_H/16$ (i.e., $2f_H$) drive signal for the second phase locked loop by repetitively counting down the $32f_H$ signal by a count of 16. In accordance with an inventive arrangement, the same synchronizing signal derived from the $32f_H/16$ divider provides a timing source for blanking for the RGB driver running at $2f_H$. Furthermore, the phase of the blanking signal is rendered adjustable in increments, by preloading the frequency dividing counter to a desired number that provides a frequency division count of other than 16.

Brief Description of the Drawings

FIGS. 4(a) and 4(b) are comparative timing diagrams. FIG. 4(a) is the signal at the junction of resistors R5 and R6 in FIG. 3, and FIG. 4(b) is line 214 of the Philips video pattern.

FIG. 5(a) is the $2f_H$ yoke current, and FIG. 5(b) is line 214 of the Philips video pattern.

DETAILED DESCRIPTION OF THE PREFERRED EMBODIMENTS

Figure 1:
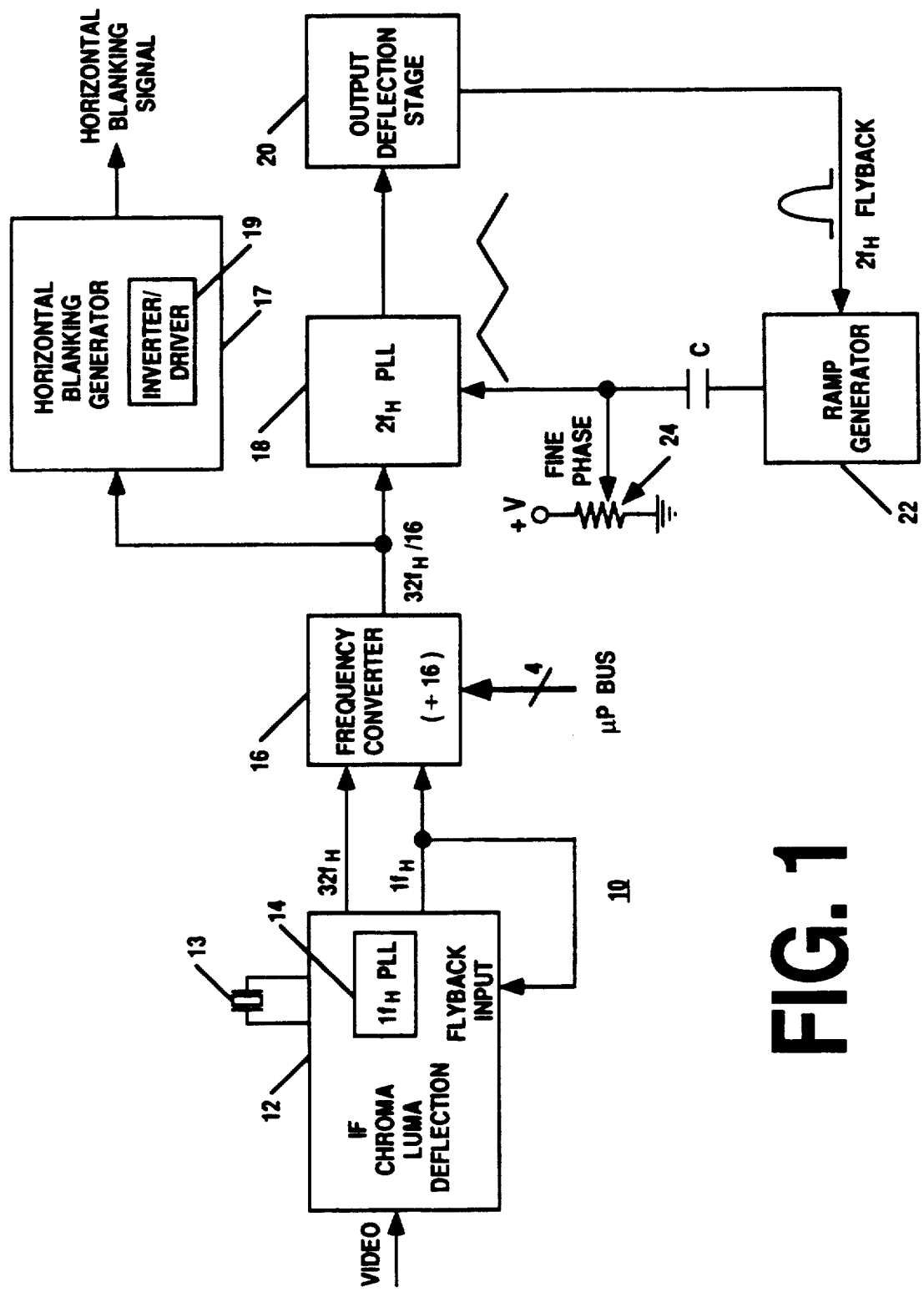
FIG. 1 is a block diagram of a horizontal synchronizing circuit and horizontal blanking generator according to an inventive arrangement, including two phase locked loops coupled through a frequency converter.

A horizontal synchronizing circuit 10 for $2f_H$ scanning utilizing two phase locked loops is shown in FIG. 1. A one-chip processor 12 provides IF, video, chroma and deflection functions. A phase locked loop 14 in the one-chip processor generates a $1f_H$ output by dividing a $32f_H$ clock signal, from a voltage controlled oscillator 13, by 32. The $1f_H$ output is synchronized with the horizontal synchronizing component of an incoming video signal, due to phase locked loop 14. A divide-by-16 circuit 16, forming a $1f_H$ to $2f_H$ frequency converter, provides a $2f_H$ output by dividing the $32f_H$ oscillator output by a nominal count of 16. The $1f_H$ output is used to synchronize the divide-by-16 circuit.

The phase of the $32f_H/16$ timing signal generated by the frequency converter can be adjusted relative to the synchronizing component of the incoming video signal. This is accomplished by preloading a starting number into the frequency dividing counting circuit 16, that counts down the $32f_H$ pulses. The number can be supplied by a microprocessor (not shown), for conveniently adjusting the phase, for example, in 2 μsec steps. Such a phase adjusting system is described in European Patent Application No. 91104520.1, published as EP 0 449 130 A2 on Oct. 2, 1991, corresponding to U.S. Pat. No. 5,223,931, the subject matter of which is fully incorporated herein by reference.

The $32f_H/16$ timing signal synchronizes a second phase locked loop 18 with an output deflection stage 20. Phase locked loop 18 operates at $2f_H$ and generates a $2f_H$ scan synchronizing signal, synchronized with the $32f_H/16$ timing signal. Flyback pulses at the $2f_H$ rate are coupled as an input to a ramp generator 22. The ramp generator is AC coupled to the flyback input of the second phase locked loop 18 by capacitor C. A variable resistance 24 can provide a further fine phase adjustment, for example from 0 to ±2 μsec, by slightly changing the DC offset to the phase comparator in the second phase locked loop. The $32f_H/16$ timing signal also provides an input to a horizontal blanking generator 17, which includes an inverter/driver circuit 19.

Figure 2:
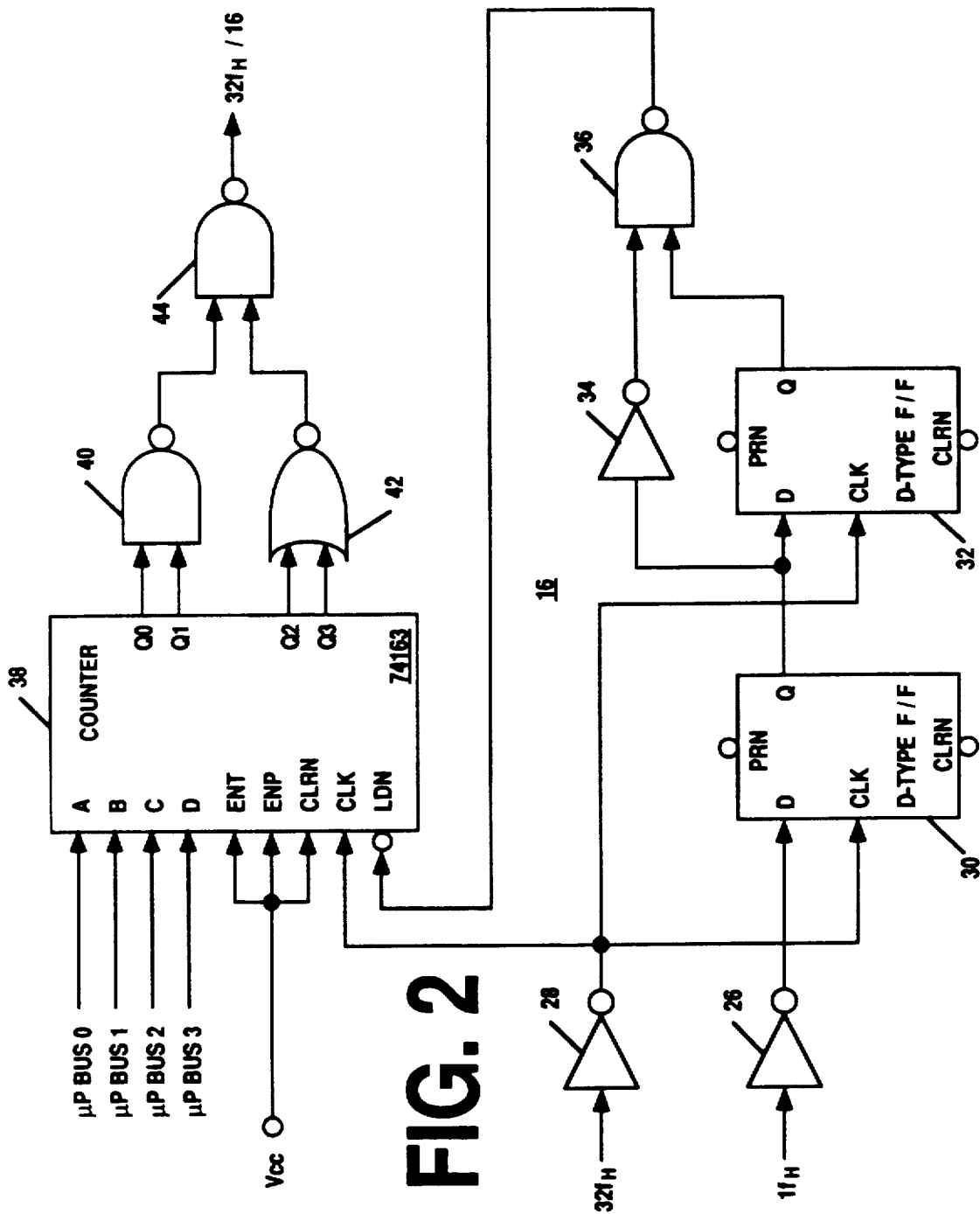
FIG. 2 is block diagram of a digital circuit for implementing the frequency converter shown in FIG. 1 as a $32f_{Hbl}/16$ divider.

A digital circuit for implementing the divide-by-16 circuit 16 is shown in FIG. 2. The $1f_H$ and $32f_H$ signals are buffered by inverters 26 and 28 respectively. The buffered $1f_H$ signal is an coupled to the D input of a first D-type flip/flop 30. The Q output of flip/flop 30 is an input to a second D-type flip/flop 32 and another inverter 34. The Q output of flip/flop 32 and the output of inverter 34 are inputs to NAND gate 36, the output of which controls the load (LDN) input of a counter 38 for loading the starting count from signals on a bus coupled to the processor. In the drawings, input terminal names ending with "N" generally indicate a signal which is a logical NOT input.

This processed $1f_H$ rate signal, which is delayed by one $32f_H$ clock cycle and is one $32f_H$ clock cycle wide, loads the bus data, μP BUS0, μP BUS1, μP BUS2 and μP BUS3, into the counter 38. The $32f_H$ signal, buffered by inverter 28, is the clock input for the flip/flops 30 and 32 and for the counter 38. The Q0 and Q1 outputs of the counter 38 are inputs to a NAND gate 40. The Q2 and Q3 outputs of counter 38 are inputs to a NOR gate 42. The outputs of NAND gate 40 and NOR gate 42 are inputs to a NAND gate 44. The output of NAND gate 44 is the $32f_H/16$, or $2f_H$, signal which drives the second phase locked loop. The relative phase of the $32f_H/16$, or $2f_H$, timing signal output of counter 38 is determined by the starting number loaded in from the microprocessor. According to the embodiment shown, this phase can be expressed in Boolean terms as:

$$[(Q0 \cdot Q1)' \cdot (Q2 + Q3)']',$$

where:

- · indicates a logical AND;
- + indicates a logical OR; and,
- ' indicates a logical NOT, or signal inversion.

Where the most significant bit is Q0 and the counter counts down, the output of NAND gate 44 is true (low) at a binary count of 0000, 0100 or 1100 (corresponding to decimal 0, 4 or 12 respectively). Accordingly, this circuit provides a phase variation of one to eight clock cycles at $32f_H$, namely between 12 and 5 (binary 1100 to 0101). For purposes of the illustrated embodiment, the phase variation required is small. It is also possible to use a gating arrangement (e.g., with a NOR gate in place of NAND gate 40 for counting from 15 to zero) to obtain up to 16 cycles of phase variation. Generally, the amount of phase variation necessary is that required to generate a blanking pulse that is earlier and wider than otherwise possible, and that accurately tracks from the beginning of the scan.

The synchronizing pulses of the output $32f_H/16$, or $2f_H$, timing signal may be moved in 2 μsec steps throughout the $1f_H$ video period by changing the data loaded into the counter 38. The output $2f_H$ sync pulse is an active low TTL level pulse 6 μsec wide. The $32f_H/16$ synchronizing pulse and a $2f_H$ flyback derived ramp determine the phasing of the $2f_H$ scan to the incoming $1f_H$ video, which is clocked out at a $2f_H$ rate by the appropriate digital signal processing, thereby synchronizing, at the picture tube, the $2f_H$ video and the $2f_H$ scan. Finer phase control of 0 to ±2 μsec can be obtained by slightly changing the DC offset to the phase comparator where the ramp is AC-coupled, as explained above. Finer phase control may be implemented by changing the slope of the ramp or introducing a small variable resistor in series with the ramp generator capacitor.

Since the $32f_H/16$ timing signal pulse is approximately 6 μsec wide and a typical $2f_H$ flyback retrace interval is 5.7 μsec, an integrated flyback pulse from which the ramp is generated can be delayed up to approximately 200 μsec from the leading edge of the $32f_H/16$ timing signal pulse. Horizontal blanking would begin too late. If the horizontal blanking is triggered from this same pulse of the $32f_H/16$ timing signal, according to the invention, it will start shortly before the retrace interval and be slightly wider than the retrace interval, thus providing correct blanking timing and width.

Figures 5A, 5B:
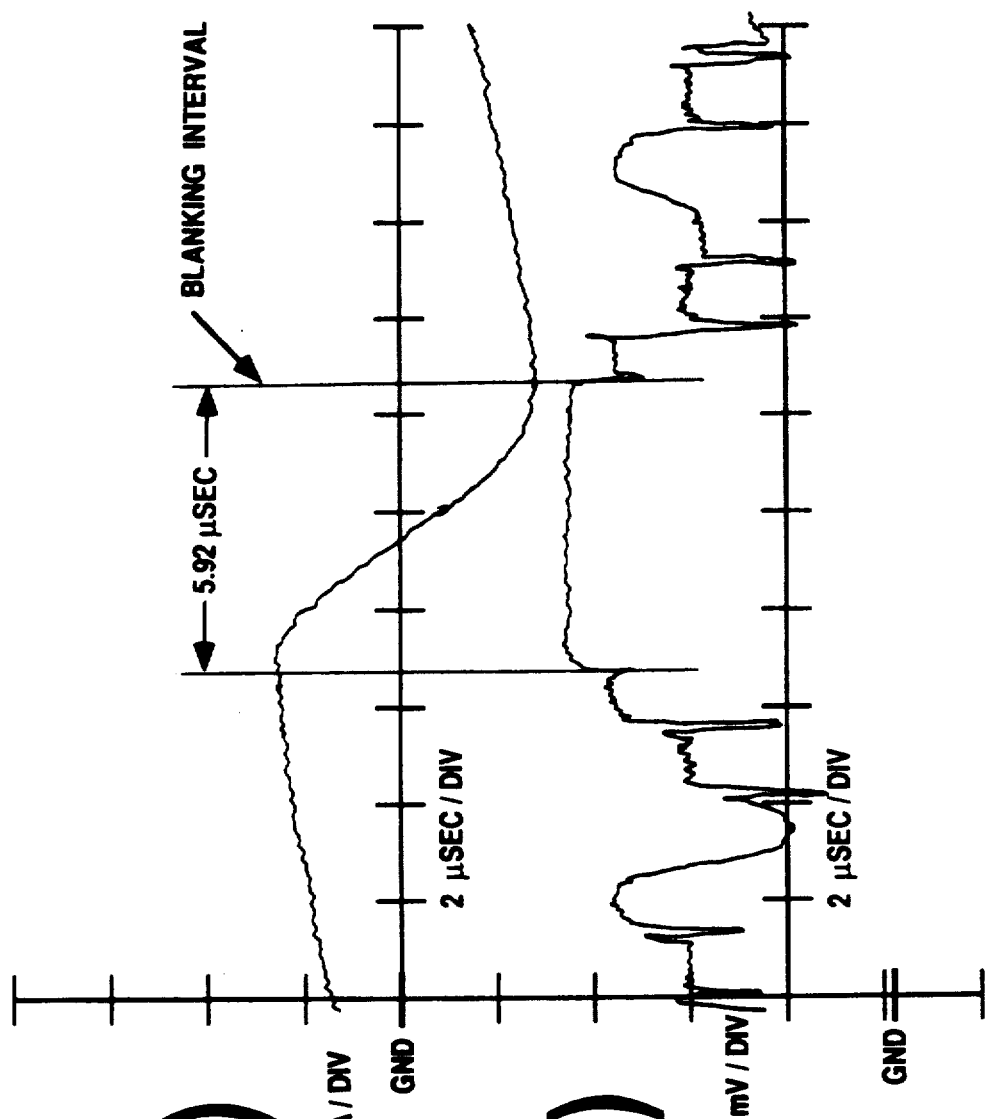
FIGS. 5(a) and 5(b) are comparative timing diagrams.

The comparative timing diagrams of FIGS. 4 and 5 illustrate how the $32f_H/16$ timing signal pulse can be used to generate a blanking signal. FIG. 4(a) illustrates the signal at the junction of resistors R5 and R6 in FIG. 4, and FIG. 4(b) illustrates line 214 of the Philips video pattern. The blanking interval of FIG. 4(a) can be seen to begin just prior to the portion of the video signal which needs to be blanked, and terminates before blanking active video for the next line. FIG. 5(a) illustrates how the $2f_H$ yoke current and FIG. 5(b) illustrates how the same line 214 of the Philips video pattern fall just within the blanking interval.

Figure 3:
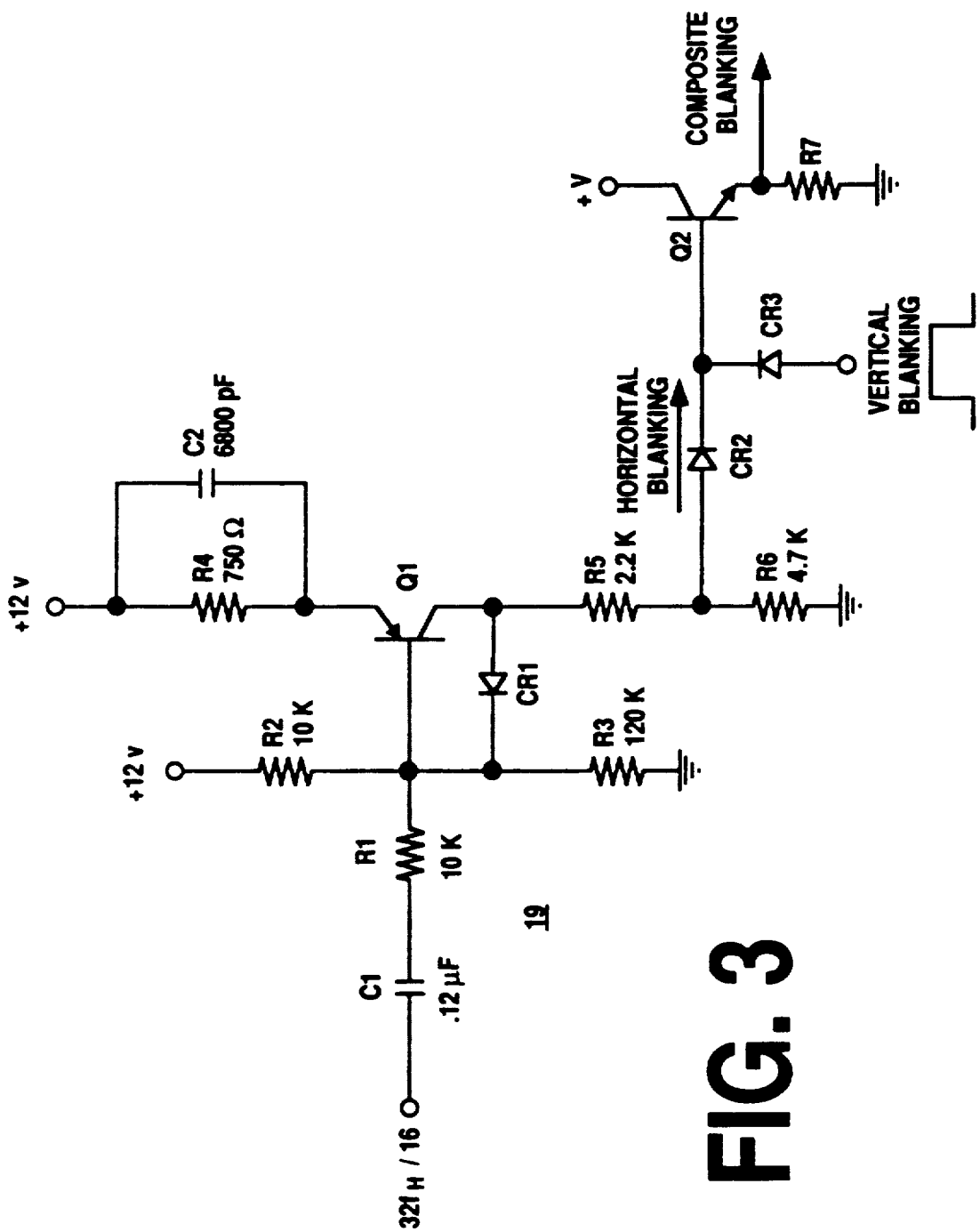
FIG. 3 is a circuit schematic for implementing the horizontal blanking generator shown in FIG. 1.

Care must be taken, if the horizontal blanking generator 17 utilizes an external inverting transistor, to minimize storage time effects and ensure that the blanking pulse ends at the proper time and does not blank active video. A suitable circuit 19 for an inverting and driving stage for a blanking circuit according to an inventive aspect is shown in FIG. 3. The inverter/driver includes transistor Q1. The $32f_H/16$ timing signal is AC coupled to the inverter through capacitor C1. Resistors R1, R2 and R3 offer a high enough impedance to avoid any significant loading of the signal. Diode CR1 controls the saturation of transistor Q1 to minimize storage time and output width. The choice of resistor R4 controls the slicing level of the trailing edge of the pulse, and the capacitor C2 provides a fixed fast start of the leading edge. The ramp at the emitter of transistor Q1 is generated during the pulse and lowers the slice level for the turn off point, thereby maintaining proper blanking width.

Resistors R5 and R6 form a voltage divider to provide interfacing to the buffer transistor Q2, which is configured as an emitter follower. The horizontal and vertical blanking signals are combined at the junction of diodes CR2 and CR3, which is also the base of transistor Q2. The output of transistor Q3 is a composite blanking signal.

Therefore, once the video delays have been established through the video processing channel and the phasing has been set by digital data (from the microprocessor or by hard wired jumpers) as well as the DC offset of the second phase locked loop, the blanking will be perfectly timed with the video.

What is claimed is:

1. An apparatus, comprising:
    a first phase locked loop operable at a horizontal synchronizing frequency $f_H$ and synchronized to a horizontal synchronizing component of a video signal;
    an $f_H$ to $nf_H$ converter for deriving an $nf_H$ timing signal from at least one output of said first phase loop, where n is an integer;
    a second phase locked loop, synchronized with said $nf_H$ timing signal, for generating an $nf_H$ scan synchronizing signal for synchronizing a deflection stage operating at $nf_H$; and,
    means responsive to said $nf_H$ timing signal and operable to generate a blanking signal for disabling an electron beam during horizontal retrace intervals of said deflection stage.

2. The apparatus according to claim 1, comprising an $mf_H$ oscillator forming part of said first phase locked loop and providing said output to which said $f_H$ to $nf_H$ converter is responsive, where m is an integer multiple of n.

3. The apparatus according to claim 2, wherein m equals 32 and n equals 2.

4. The apparatus according to claim 1, wherein n equals 2.

5. The apparatus according to claim 1, wherein said $f_H$ to $nf_H$ converter comprises a counter for dividing a clock signal, said horizontal blanking signal having pulses with widths defined by integer multiples of periods of said clock signal.

6. The apparatus according to claim 1, further comprising means for combining said horizontal blanking signal with a vertical blanking signal to develop a composite blanking signal.

7. A horizontal blanking signal generator, comprising:
    a first phase locked loop coupled to a video signal having a horizontal synchronizing component at a frequency $f_H$ and including an oscillator generating a signal at $mf_H$ signal, where m is an integer;
    a frequency divider for converting said $mf_H$ signal to an $nf_H$ timing signal, where n is another integer, by dividing said $mf_H$ signal;
    a second phase locked loop, synchronized with said $nf_H$ timing signal, for generating an $nf_H$ scan synchronizing signal for synchronizing a deflection stage operating at $nf_H$;
    means for successively supplying said frequency divider with starting numbers selected to control a phase relationship of said $nf_H$ timing signal and said $mf_H$ signal; and,
    means responsive to said $nf_H$ timing signal for generating video signal horizontal blanking pulses.

8. The signal generator according to claim 7, further comprising means for modifying said $nf_H$ timing signal in at least one of phase and pulse width.

9. The signal generator according to claim 7, wherein n equals 2.

10. The signal generator according to claim 7, wherein m equals 32 and n equals 2.

11. A horizontal deflection system, comprising:
    means for generating an $nf_H$ timing signal synchronously with an $f_H$ horizontal synchronizing component in a video signal, where n is an integer and $nf_H$ is higher frequency than $f_H$;
    first means responsive to said $nf_H$ timing signal for generating an $nf_H$ scan synchronizing signal synchronously with said $nf_H$ timing signal;
    a horizontal deflection stage operable at $nf_H$ and responsive to said $nf_H$ scan synchronizing signal; and,
    second means responsive to said $nf_H$ timing signal for generating horizontal blanking pulses.

12. The system according to claim 11, further comprising means for combining said horizontal blanking pulses with vertical blanking pulses to form a composite blanking signal.

13. The system according to claim 11, wherein said means for generating said $nf_H$ timing signal comprises:
    a first phase locked loop; and,
    a frequency divider responsive to said first phase locked loop.

14. The system according to claim 13, wherein said first means responsive to said $nf_H$ timing signal for generating said $nf_H$ scan synchronizing signal comprises a second phase locked loop.

15. The system according to claim 11, wherein said means for generating said $nf_H$ timing signal comprises:
    means for generating a clock signal at $mf_H$, where m is an integer and $mf_H$ is a higher frequency than $nf_H$; and,
    means for dividing said $mf_H$ clock signal to generate said $nf_H$ timing signal.

16. The system of claim 11, wherein said second means responsive to said $nf_H$ timing signal comprises a driver/inverter.

* * * * *

UNITED STATES PATENT AND TRADEMARK OFFICE
CERTIFICATE OF CORRECTION

PATENT NO. : 5,329,367

DATED : July 12, 1994

INVENTOR(S) : Ronald E. Fernsler; Walter Truskalo

It is certified that error appears in the above-identified patent and that said Letters Patent is hereby corrected as shown below:

On the title page, under (56) References Cited, insert U.S. PATENT DOCUMENTS and the following:

-- U.S. PATENT DOCUMENTS

| | | | |
|---|---|---|---|
| 3,891,800 | 6/1975 | Janssen et al | 178/69.5 |
| 4,317,133 | 4/1982 | Fernsler et al | 358/158 |
| 4,327,376 | 1/1984 | Balaban et al | 358/159 |
| 4,426,661 | 5/1984 | Okada et al | 358/140 |
| 4,446,482 | 10/1984 | Srivastava et al | 358/150 |
| 4,476,490 | 5/1985 | Kaneko | 358/148 |
| 4,520,394 | 5/1986 | Kaneko | 358/150 |
| 4,591,910 | 1/1987 | Lai et al | 358/148 |
| 4,636,861 | 1/1987 | Willis | 358/158 |
| 4,639,780 | 1/1987 | Willis | 358/150 |
| 4,791,488 | 12/1988 | Fukazawa et al | 358/149 |
| 4,802,009 | 1/1989 | Hartmeier | 358/158 |
| 4,870,490 | 9/1989 | Sekiya et al | 358/158 |
| 4,996,506 | 2/1991 | Ishikawa et al | 333/219.1-- |

On title page, under   FOREIGN PATENT DOCUMENTS, insert the following:

--62-81177   4/1987   Japan...............................

UNITED STATES PATENT AND TRADEMARK OFFICE
CERTIFICATE OF CORRECTION

PATENT NO. : 5,329,367

DATED : July 12, 1994

INVENTOR(S) : Ronald E. Fernsler; Walter Truskalo

It is certified that error appears in the above-indentified patent and that said Letters Patent is hereby corrected as shown below:

62-216588    9/1987    Japan..........................................—

Signed and Sealed this

Sixteenth Day of May, 1995

Attest:

BRUCE LEHMAN

Attesting Officer

Commissioner of Patents and Trademarks